United States Patent
Mita (10) Patent No.: US 10,567,605 B2
(45) Date of Patent: Feb. 18, 2020

(54) IMAGE FORMING APPARATUS AND CALIBRATION METHOD

(71) Applicant: Konica Minolta, Inc., Tokyo (JP)

(72) Inventor: Mieko Mita, Hino (JP)

(73) Assignee: Konica Minolta, Inc., Tokyo (JP)

( * ) Notice: Subject to any disclaimer, the term of this patent is extended or adjusted under 35 U.S.C. 154(b) by 23 days.

(21) Appl. No.: 15/927,151

(22) Filed: Mar. 21, 2018

(65) Prior Publication Data
US 2018/0278757 A1    Sep. 27, 2018

(30) Foreign Application Priority Data

Mar. 23, 2017   (JP) .................................. 2017-057548

(51) Int. Cl.
| | | |
|---|---|---|
| H04N 1/00 | (2006.01) | |
| G06F 3/12 | (2006.01) | |
| G06K 15/02 | (2006.01) | |
| G06T 1/00 | (2006.01) | |

(52) U.S. Cl.
CPC ......... *H04N 1/0066* (2013.01); *G06T 1/0007* (2013.01); *H04N 1/00761* (2013.01); *H04N 1/0057* (2013.01)

(58) Field of Classification Search
None
See application file for complete search history.

(56) References Cited

U.S. PATENT DOCUMENTS

| | | | | |
|---|---|---|---|---|
| 6,285,799 | B1 * | 9/2001 | Dance .................. | H04N 17/002 382/260 |
| 2003/0011798 | A1 * | 1/2003 | Yamamoto .......... | B41F 33/0036 358/1.9 |
| 2005/0286922 | A1 * | 12/2005 | Oki ...................... | H04N 1/0058 399/75 |
| 2007/0035755 | A1 * | 2/2007 | Maki .................. | H04N 1/00384 358/1.9 |
| 2011/0007371 | A1 * | 1/2011 | Yip ........................ | B41J 2/2135 358/504 |
| 2016/0241730 | A1 * | 8/2016 | Mizuno .............. | H04N 1/00702 |
| 2018/0141329 | A1 * | 5/2018 | Aoyagi .................... | B41J 29/02 |

FOREIGN PATENT DOCUMENTS

| | | |
|---|---|---|
| JP | 2003-307466 A | 10/2003 |
| JP | 2016-147481 A | 8/2016 |

* cited by examiner

*Primary Examiner* — Beniyam Menberu
(74) *Attorney, Agent, or Firm* — Osha Liang LLP (57) ABSTRACT

An image forming apparatus includes: an image former that forms a document image including a correction image; an image reader; and a calibrator, and performing correction, wherein the document image is designed so that main register marks and a subsidiary register mark are provided, and the calibrator includes a four-corner detector that detects four corners of a sheet of paper, a main register mark reference position detector that detects reference positions of the main register marks, a subsidiary register mark prediction position determiner that predicts and determines prediction positions of the subsidiary register marks, a subsidiary register mark reference position detector that detects a reference position of the subsidiary register mark, a correction image prediction position determiner that predicts and determines a prediction position of the correction image, a measured value obtainer, and a correction value calculator.

16 Claims, 10 Drawing Sheets

IMAGE FORMING APPARATUS AND CALIBRATION METHOD

The entire disclosure of Japanese patent Application No. 2017-057548, filed on Mar. 23, 2017, is incorporated herein by reference in its entirety.

BACKGROUND

Technological Field

The present invention relates to an image forming apparatus and a calibration method.

Description of the Related Art

Conventionally, in an image forming apparatus such as a printer and a copying machine, corrections are performed by forming a correction image, on a sheet of paper, for correcting an image position, distortion, density, color, and the like, obtaining various measurement values from read image data, which is generated by reading the sheet of paper, and calculating a correction value base on the measurement values. In this case, to obtain an accurate correction value, it is needed to extract the correction image in the read image data without misaligning the position of the correction image.

For example, there has been proposed a technology that, in an image processing device for storing correction information associated with a correction value to obtain a target output value for each pair of a plurality of density values of image data and a plurality of positions in a main scanning direction, in a case where position correction information is obtained, a plurality of register patterns (a first register pattern, a second register pattern, . . . ) are provided along the main scanning direction, and the reading position in the main scanning direction is corrected based on a distance between register marks in the image data, which are obtained by reading the patterns, and a distance between designed register marks (see JP 2016-147481 A).

Further, there has been proposed a calibration device that takes an image of a calibration chart including a first mark and a second mark with a camera, extracts the first mark from the image, obtains a rough position of the second mark by a projection conversion, detects an accurate position of the second mark in the vicinity of the rough position of the second mark, and calculates a calibration correction value of a lens according to the accurate position of the second mark and the position of the second mark in the chart (see JP 2003-307466 A).

However, there has been a case where the correction image does not exist in a preferred position in the read image data because of a reading distortion of the image reading device which reads the correction image, an unevenness of the sheet conveyance speed in an image formation, a sheet conveyance position misalignment, distortion due to a thermal expansion, or the like.

According to the invention described in JP 2016-147481 A, only a linear position correction in the main scanning direction can be performed and curved or tilted reading distortion cannot be corrected. Thus, depending on how the distortion of the read image is caused, positions of second register patterns and following register patterns for obtaining target density value cannot be accurately detected. In addition, changes of the reading position in the sub scanning direction cannot be corrected.

Further, according to the invention described in JP 2003-307466 A, the second mark is detected by using the first mark; however, the second mark is not used to detect a position of the correction image.

SUMMARY

Embodiments of the present invention are directed to accurately detect the position of the correction image and reflect the detected position in the correction function.

According to an aspect of the present invention, an image forming apparatus reflecting one aspect of the present invention comprises: an image former that forms a document image including a correction image related to a predetermined correction function on a sheet of paper based on document image data; an image reader that reads a sheet surface on which the document image is formed and generates read image data; and a calibrator that calculates a correction value related to the predetermined correction function based on the read image data, and performing correction related to the predetermined correction function based on the calculated correction value, wherein the document image is designed so that main register marks are provided near four corners of the document image and a subsidiary register mark is provided near the correction image, the calibrator includes a four-corner detector that detects four corners of a sheet of paper from the read image data, a main register mark reference position detector that detects reference positions of the main register marks near the detected four corners, a subsidiary register mark prediction position determiner that predicts positions of the subsidiary register marks in the read image data from the reference position of the detected main register mark and reference positions of the main register marks in the document image data, and determines prediction positions of the subsidiary register marks, a subsidiary register mark reference position detector that detects a reference position of the subsidiary register mark in a vicinity of the prediction position of the subsidiary register mark, a correction image prediction position determiner that predicts a position of the correction image in the read image data according to the reference position of the detected subsidiary register mark and the reference position of the subsidiary register mark in the document image data and determines a prediction position of the correction image, a measured value obtainer that obtains a measurement value of the correction image based on the prediction position of the correction image, and a correction value calculator that calculates a correction value based on the measurement value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, various embodiments of an image forming apparatus according to the present invention will be described with reference to the drawings. However, the scope of the invention is not limited to the disclosed embodiments.

Figure 1:
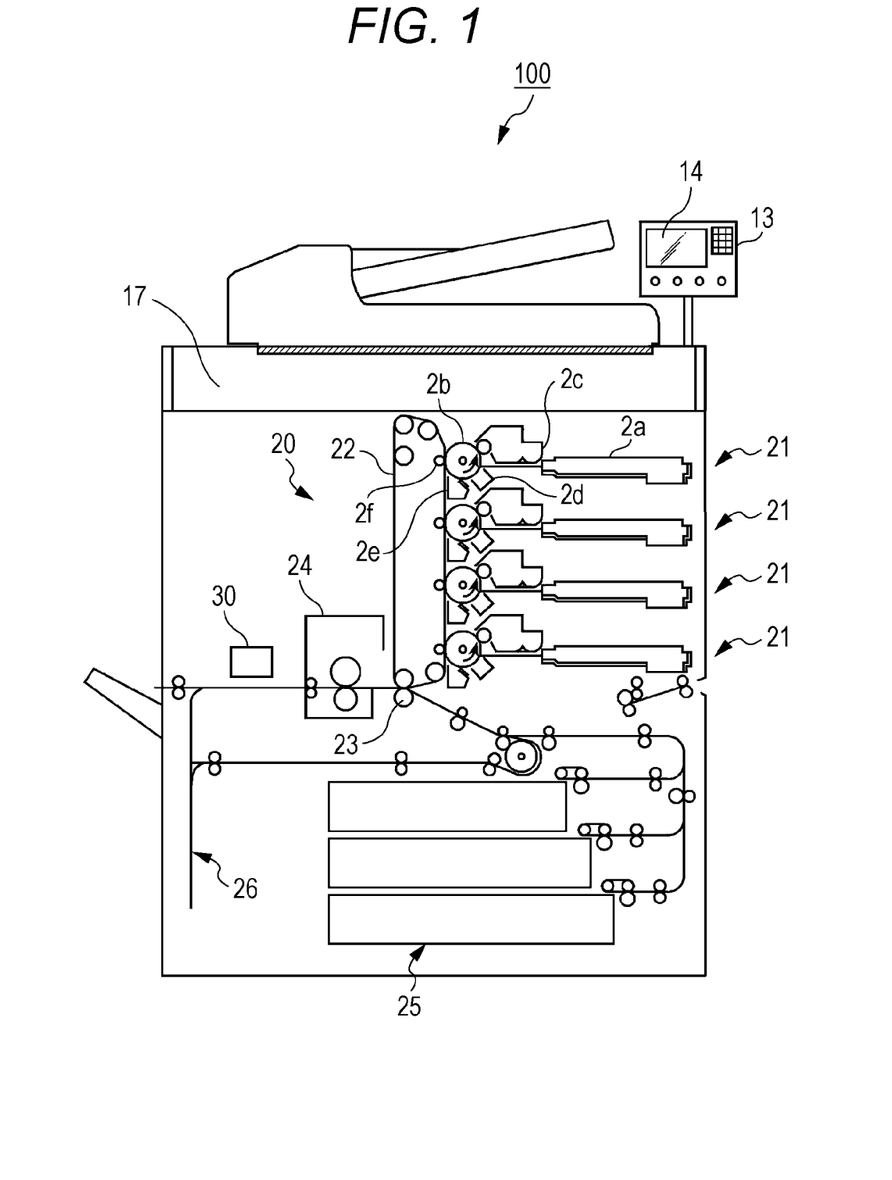
FIG. 1 is an outline sectional view illustrating an entire configuration of an image forming apparatus according to one or more embodiments of the present invention.
Figure 2:
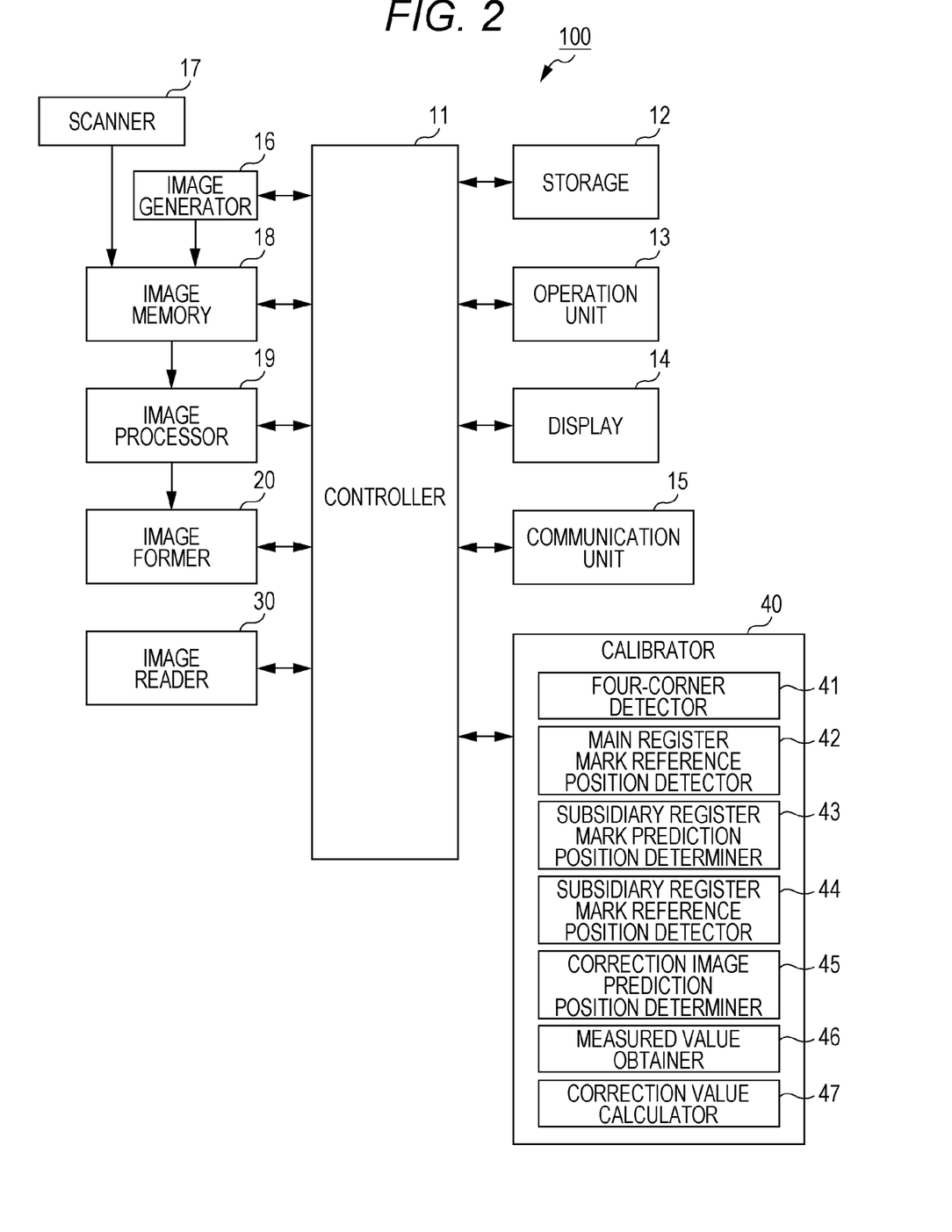
FIG. 2 is a block diagram illustrating a functional configuration of the image forming apparatus.

FIG. 1 is an outline sectional view illustrating an entire configuration of an image forming apparatus 100 according to one or more embodiments of the present invention. FIG. 2 is a block diagram illustrating a functional configuration of the image forming apparatus 100. The image forming apparatus 100 forms an image composed of different colors on a sheet of paper.

As illustrated in FIG. 2, the image forming apparatus 100 includes a controller 11, a storage 12, an operation unit 13, a display 14, a communication unit 15, an image generator 16, a scanner 17, an image memory 18, an image processor 19, an image former 20, an image reader 30, a calibrator 40, and the like.

The controller 11 is composed of a central processing unit (CPU), a random access memory (RAM), and the like, reads various programs from the storage 12, and executes the programs to controls each unit.

For example, the controller 11 controls the image processor 19 to perform image processing on image data, which is generated by the image generator 16 or scanner 17 and stored in the image memory 18, and controls the image former 20 to form an image on a sheet of paper based on the processed image data.

The storage 12 stores programs, which are readable by the controller 11, and files used to execute the programs, and the like. The storage 12 may be a large-capacity memory such as a hard disk.

As illustrated in FIG. 1, the operation unit 13 and display 14 serve as user interfaces provided in an upper part of the image forming apparatus 100.

The operation unit 13 generates an operation signal according to user's operation and outputs the operation signal to the controller 11. The operation unit 13 may be a keypad, a touch panel, which is integrally formed with the display 14, and the like.

The display 14 displays an operation screen or the like according to an instruction from the controller 11. The display 14 may be a liquid crystal display (LCD), an organic electro luminescence display (OELD), and the like.

The communication unit 15 transmits and receives data to and from an external device, which is connected to a communication network. For example, the communication unit 15 receives, from the external device, data (PDL data) in which instruction contents to form an image is written in a page description language (PDL).

The image generator 16 performs a rasterisation process on the PDL data received by the communication unit 15 and generates image data in a bitmap format. This image data is formed in four colors including C (cyan), M (magenta), Y (yellow) and K (black) and each pixel has pixel values of the four colors. The pixel value is a data value which indicates a tone of an image and, for example, 8-bit data value indicates a tone of 0 to 255 gradation levels.

The scanner 17 scans a surface of a document and generates image data in a bitmap format having pixel values of colors including R (red), G (green), and B (blue) respectively. This image data may be converted into image data of each color of the four colors CMYK by a color conversion unit or the like.

The image memory 18 is a buffer memory for temporarily storing the image data generated by the image generator 16 or scanner 17. The image memory 18 may be a dynamic RAM (DRAM) or the like.

The image processor 19 reads image data from the image memory 18 and performs a distortion correction process, a density correction process, a color correction process, a halftone process, and the like.

The distortion correction process is a process to correct image data so that a position where the image is formed is in a target position. The density correction process is a process to convert each pixel value of the image data so that the density characteristic of the image to be formed becomes a target density characteristic. The color correction process is a process to convert a pixel value of each color of image data so that the colors of the image becomes the target colors. The halftone process is a process to reproduce pseudo multi-gradation such as screen processing, error diffusion processing, and the like, which uses a dither method.

The image processor 19 converts a pixel value according to a look-up table (LUT) in the density correction process and color correction process. The LUT is a table that associates an input value and an output value so that a target density characteristic or a target color can be reproduced.

The image former 20 forms an image composed of the four colors of CMYK on a sheet of paper according to the pixel values of the four colors in each pixel of the image data, which is processed in the image processor 19. As illustrated in FIG. 1, the image former 20 includes four writing units 21, an intermediate transfer belt 22, a secondary transfer roller 23, a fixing device 24, a paper feed tray 25, and a conveyance path 26.

The four writing units 21 are provided in series (in tandem) along a belt surface of the intermediate transfer belt 22 and form an image having CMYK colors on the intermediate transfer belt 22. Each writing unit 21 has a same configuration in which the color of the image to be formed is different and includes an exposure unit 2a, a photoreceptor 2b, a developing unit 2c, a charging unit 2d, a cleaning unit 2e, and a primary transfer roller 2f, as illustrated in FIG. 1.

When forming an image, after charging the photoreceptor 2b with the charging unit 2d, each writing unit 21 scans on the photoreceptor 2b with a light flux emitted from the exposure unit 2a based on the image data and forms an electrostatic latent image. When a color material such as toner is supplied from the developing unit 2c and developed, an image is formed on the photoreceptor 2b.

The images respectively formed on the photoreceptors 2b of the four writing units 21 are transferred (first transferring) onto the intermediate transfer belt 22 as overlapping in order by the respective primary transfer roller 2f. With this configuration, on the intermediate transfer belt 22, an image composed of the respective colors is formed. After the first transferring, the cleaning unit 2e removes the color materials remained on the photoreceptor 2b.

The image former 20 supplies a sheet of paper from the paper feed tray 25 and, after the secondary transfer roller 23 transfers (second transferring) the image from the intermediate transfer belt 22 onto the sheet of paper, the fixing device 24 performs heating and pressing the sheet to perform a fixing process.

When images are formed on both sides of the sheet, the sheet is converted to the conveyance path 26 to reverse the front side and rear side of the sheet and then the sheet is conveyed to the secondary transfer roller 23 again.

The image former 20 forms a document image including a correction image related to a predetermined correction function based on document image data stored in the storage 12. The correction image is an image used in various correction functions and its position, size and pattern are determined in advance according to the correction function which is related to the correction image. For example, a correction image related to a position correction is provided covering the entire area of the sheet. A correction image related to a color correction is provided in a center area where an image can be stably formed. In correction image related to an uneven density in a main scanning direction, a band-like pattern with each density is provided along the main scanning direction. Further, a correction image is composed of a patch pattern corresponding to the color or density as a target of the correction, a position misalignment measurement pattern including thin lines, and the like.

As illustrated in FIG. 1, the image reader 30 is provided in the sheet conveyance path, and the image former 20 reads the surface of the sheet on which the image is formed and generates read image data in a bitmap format having pixel values of RGB colors. The image reader 30 may be a line sensor in which sensors such as a charge coupled device (CCD) are provided in one dimension, an area sensor provided in a two dimension, or the like.

The image reader 30 reads the surface of the sheet on which the document image is formed and generates read image data.

The calibrator 40 calibrates at least one of the position, density, gradation reproduction, and color reproduction of an image formed by the image former 20. The calibrator 40 calculates a correction value related to a predetermined correction function, based on the read image data generated by the image reader 30. The correction value is a parameter to adjust an image forming condition in the image former 20 and an image processing condition of image data in the image processor 19.

As illustrated in FIG. 2, the calibrator 40 includes a four-corner detector 41, a main register mark reference position detector 42, a subsidiary register mark prediction position determiner 43, a subsidiary register mark reference position detector 44, a correction image prediction position determiner 45, a measured value obtainer 46, a correction value calculator 47, and the like.

The processing content of each unit in the calibrator 40 may be realized by hardware processing by using an image processing circuit such as an application specific integrated circuit (ASIC), a field-programmable gate array (FPGA), or the like, or may be realized by software processing that a processor such as a CPU or a graphics processing unit (GPU) reads and executes a program.

The four-corner detector 41 detects four corners of the sheet in the read image data generated by the image reader 30. The read image data includes a sheet area and a background area around the sheet area. The four-corner detector 41 extracts the sheet area and detects the four corners of the sheet by comparing the pixel values of the read image data with a threshold value.

The main register mark reference position detector 42 detects reference positions of the main register marks near the four corners detected in the read image data. More specifically, the main register mark reference position detector 42 sets main-register-mark windows, as processing target areas, in a size that respectively includes the entire main register mark, near the detected four corners in the read image data, generates profile data in the main scanning direction and dub scanning direction in the main-register-mark windows, and detects reference positions of the main register marks based on the profile data. The size of the main-register-mark window is determined in advance according to a correction function corresponding to a correction image. The reference position is a reference position that indicates a position of a register pattern of the main register mark and subsidiary register mark. According to the present one or more embodiments, a position of an intersection point in the cross shape of the register pattern is set as a reference position.

The subsidiary register mark prediction position determiner 43 predicts positions of the subsidiary register marks in the read image data according to the reference positions of the main register marks detected in the read image data and the reference positions of the main register marks in the document image data, and determines the prediction positions of the subsidiary register marks. More specifically, the subsidiary register mark prediction position determiner 43 predicts the positions of the subsidiary register marks in the read image data by a projection conversion process based on the reference positions of the main register marks detected in the read image data and the reference positions of the main register marks in the document image data. Here, the size of the subsidiary register marks does not always have to be the same as the size of the main register marks.

The projection conversion process is a process to convert a coordinate on one plane into a coordinate on another plane. The subsidiary register mark prediction position determiner 43 calculates a conversion coefficient of the projection conversion process in which the reference positions (four positions) of the main register marks in the document image data are converted into the reference positions (four positions) of the main register marks detected in the read image data, and predicts the positions of the subsidiary register marks in the read image data by obtaining where in the read image data the reference positions of the subsidiary register marks in the document image data are converted in the projection conversion process.

The subsidiary register mark reference position detector 44 detects the reference positions of the subsidiary register marks in the vicinity of the prediction positions of the subsidiary register marks in the read image data. More specifically, the subsidiary register mark reference position detector 44 sets subsidiary-register-mark windows, as processing target areas, in a size that respectively includes whole subsidiary register mark, based on the prediction positions of the subsidiary register marks in the read image data, generates profile data in the main scanning direction and sub scanning direction in the subsidiary-register-mark windows, and detects the reference positions of the subsidiary register marks based on the profile data. The size of the subsidiary-register-mark windows is determined in advance according to the correction function corresponding to the correction image.

The correction image prediction position determiner 45 predicts a position of the correction image in the read image data based on the reference positions of the subsidiary register marks detected in the read image data and the reference positions of the subsidiary register marks in the document image data, and determines the prediction position of the correction image. More specifically, the correction image prediction position determiner 45 predicts the position of the correction image in the read image data by the projection conversion process based on the reference positions of the subsidiary register marks detected in the read image data and the reference positions of the subsidiary register marks in the document image data.

The measured value obtainer 46 obtains a measurement value from the correction image based on the prediction position of the correction image. More specifically, the measured value obtainer 46 sets a correction-image window, as a processing target area, based on the prediction position of the correction image in the read image data, and obtains a measurement value of the correction image in the correction-image window. The size of the correction-image window is determined in advance according to the correction function corresponding to the correction image.

The measurement value is a value obtained for correction in the correction function corresponding to the correction image. For example, in a density/gradation correction and a color correction, an RGB value of each pixel obtained from the patch pattern area of the read image data or a CMYK value converted from the RGB value is used as a measurement value. In a position correction, as the measurement value, a reading position (coordinate) in the correction image obtained from the position misalignment measurement pattern area of the read image data is used. In a position alignment between CMYK, as the measurement value, a reading position of each color of the correction image obtained from the position misalignment measurement pattern area of the read image data is used.

The correction value calculator 47 calculates a correction value related to a predetermined correction function based on the measurement value. For example, in the density/gradation correction or color correction, a correction value is calculated so that the density or color of the patch pattern becomes a target value. Further, in an absolute position alignment, a correction value for correcting positions is calculated based on the reading position of the position misalignment measurement pattern obtained from the read image data and a target position (a position in the document image data). In the position alignment between CMYK, a correction value is calculated so that the relative positions are aligned such that a position of one color is adjusted with a position of another color.

Next, an operation in the image forming apparatus 100 will be described.

Figure 3:
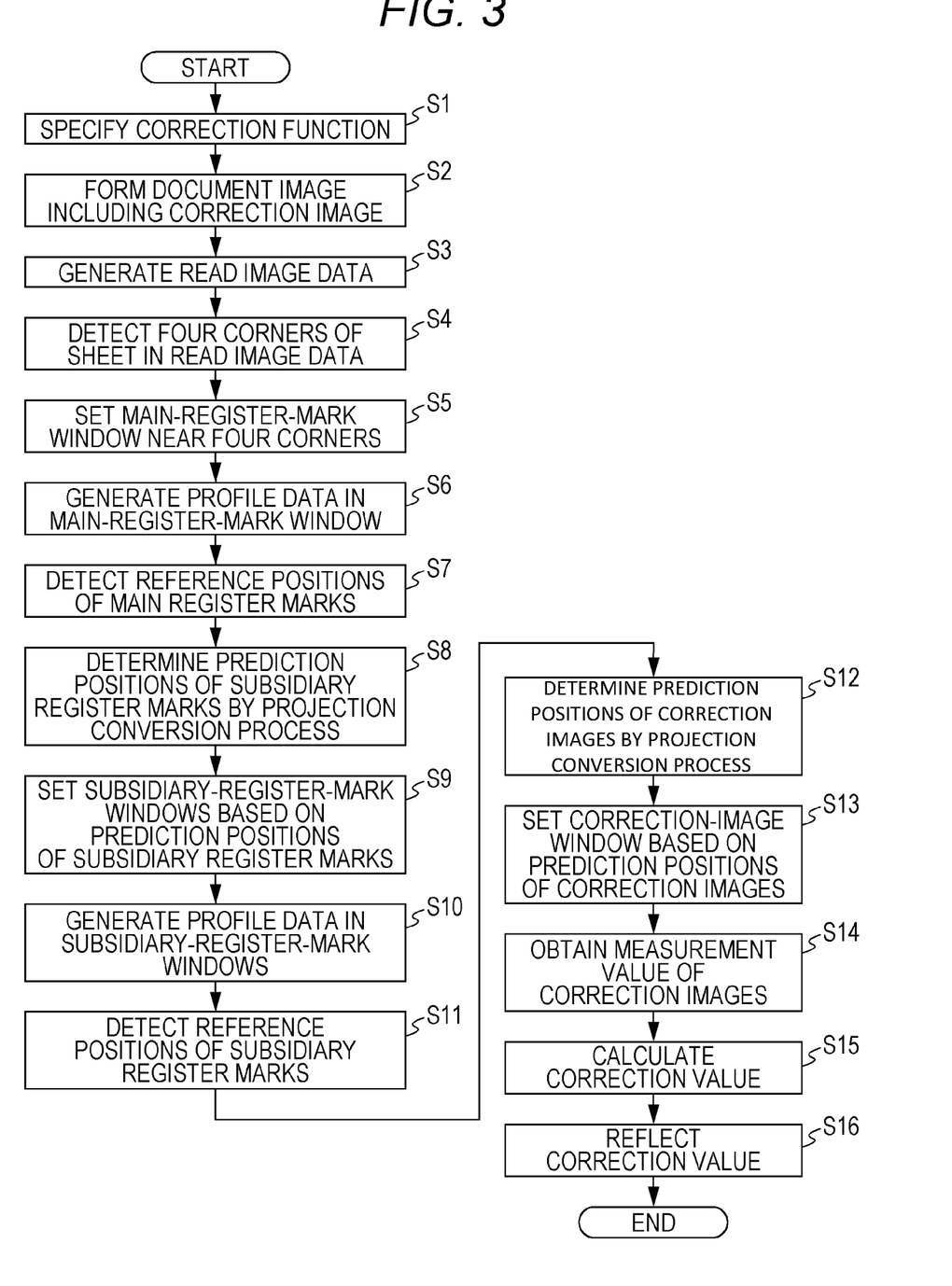
FIG. 3 is a flowchart of a calibration process executed by the image forming apparatus.

FIG. 3 is a flowchart illustrating a calibration process executed by the image forming apparatus 100.

Firstly, a user operates the operation unit 13 and specifies a correction function as a correction target (step S1). For example, one or more correction function is specified from the position, distortion, density, color, and the like of the image.

Next, the controller 11 controls the image former 20 to form a document image including a correction image related to the specified correction function, based on the document image data (step S2).

Figure 4:
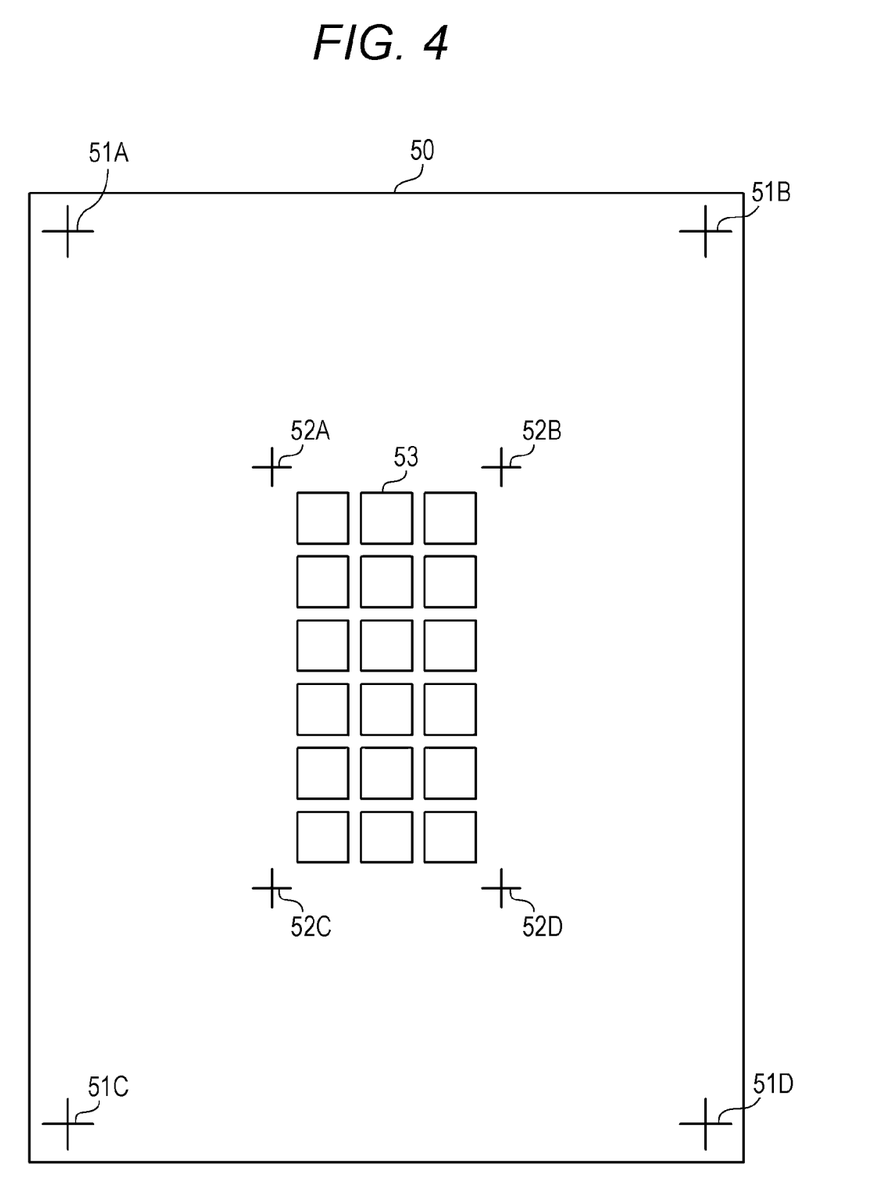
FIG. 4 is a diagram illustrating an example of a document image.

FIG. 4 illustrates an example of the document image.

As illustrated in FIG. 4, in the document image 50, main register marks 51A, 51B, 51C, and 51D are provided near the four corners of the document image 50 and subsidiary register marks 52A, 52B, 52C, and 52D are provided near correction images 53.

For example, the correction images may be provided all over the document image, or a general image (an image to be output as a job in the image forming apparatus 100) is provided in the center area and the correction images may be provide in a blank area.

Figure 5:
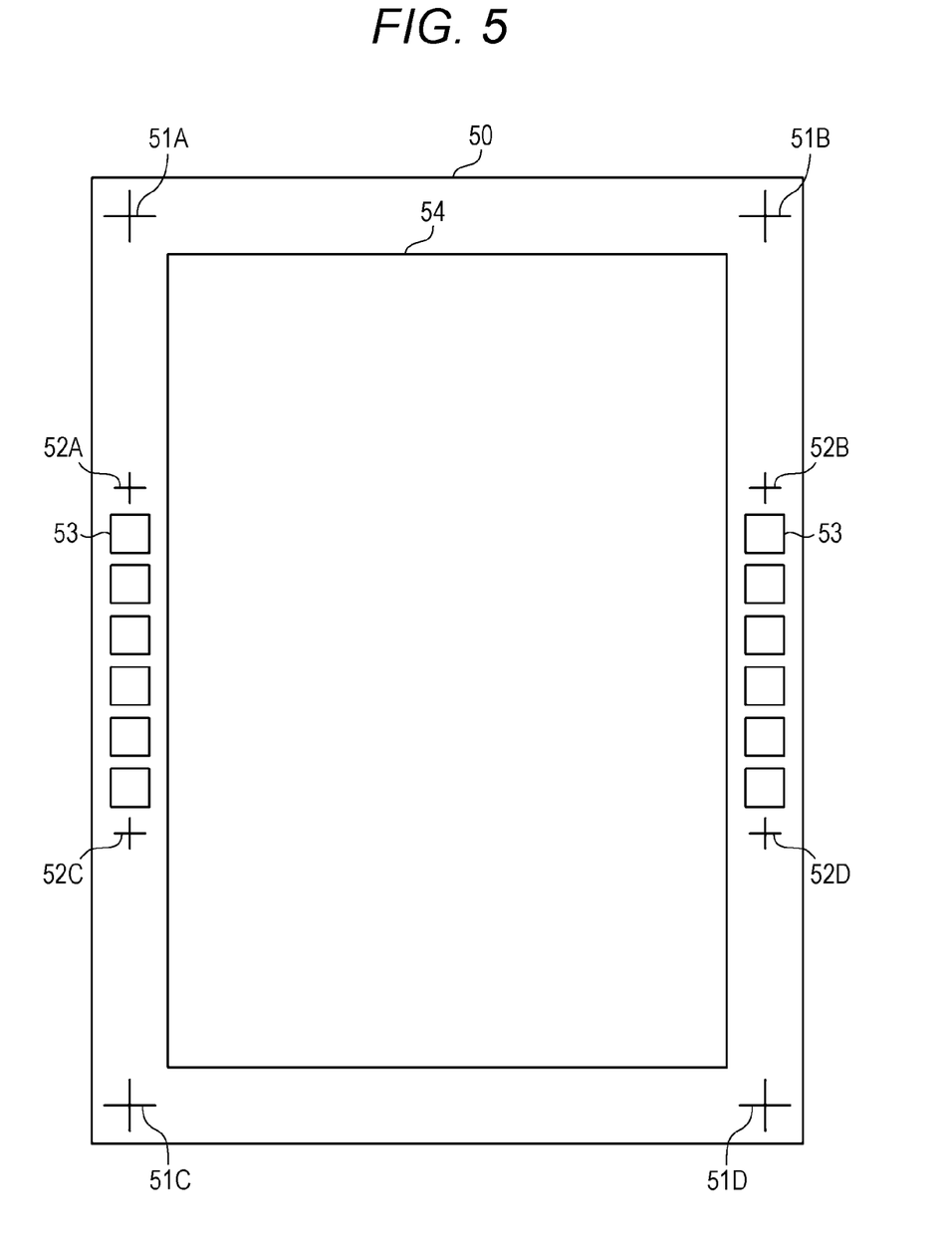
FIG. 5 is a diagram illustrating an example of a document image including a general image.

FIG. 5 illustrates an example of a document image including a general image.

According to the example illustrated in FIG. 5, a general image 54 is provided in the center area of the document image 50, and the main register marks 51A, 51B, 51C, and 51D, subsidiary register marks 52A, 52B, 52C, and 52D and correction images 53 are provided in a margin and a blank space in the document image 50. In a case where all the correction images 53 cannot be provided in a sheet of paper, the correction images 53 may be divided and formed in a plurality of sheets.

Next, the controller 11 controls the image reader 30 to read the face of the sheet on which the document image is formed and generate read image data (step S3).

Next, the four-corner detector 41 detects the four corners of the sheet in the read image data generated by the image reader 30 (step S4).

Figure 6:
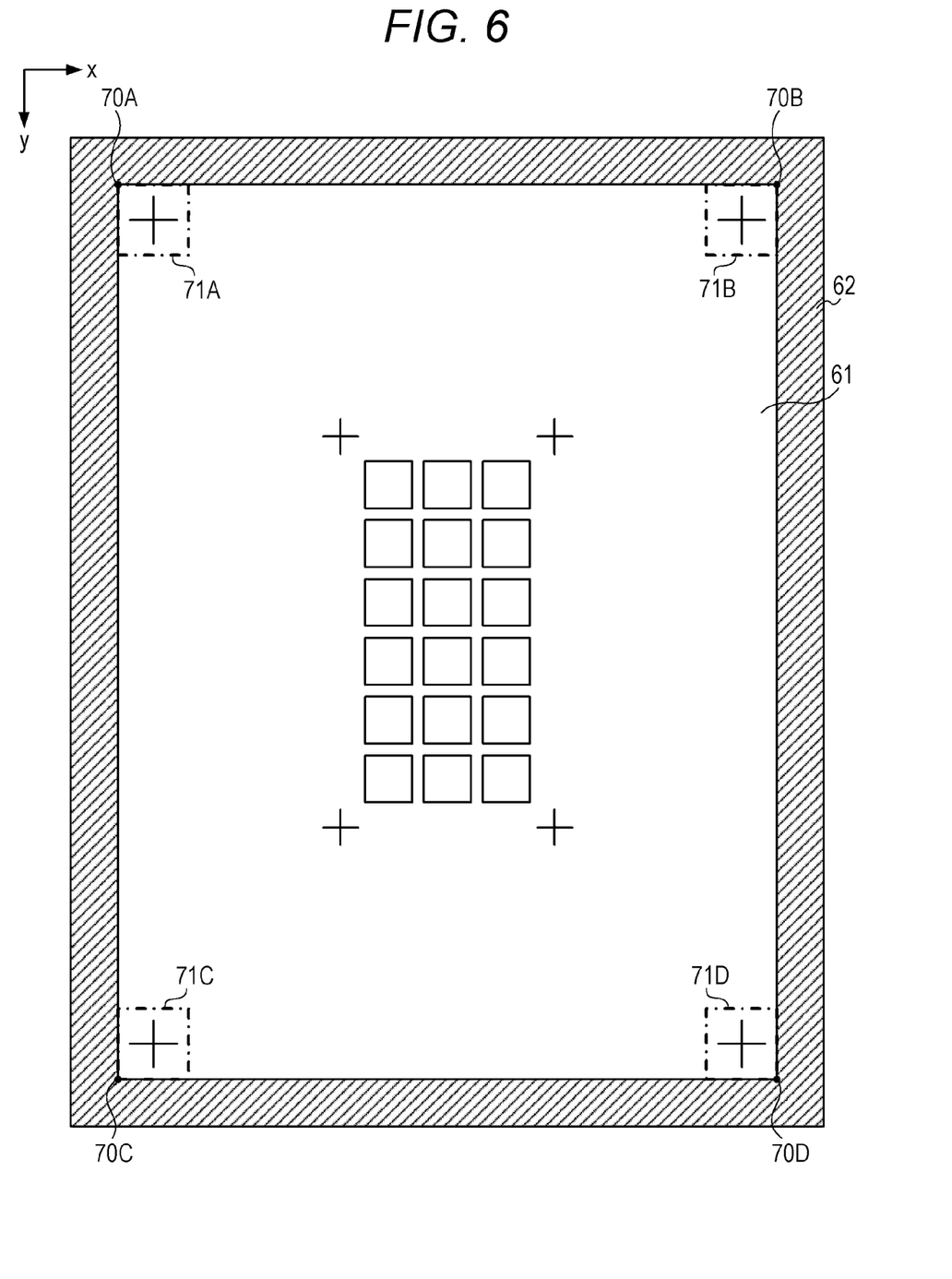
FIG. 6 is a diagram illustrating an example of read image data.

FIG. 6 illustrates an example of the read image data. Since a read area of the image reader 30 is larger than the size of the sheet, as illustrated in FIG. 6, the read image data includes a sheet area 61 and a background area 62 around the sheet area 61. The four-corner detector 41 detects coordinates that divide the sheet area 61 and background area 62 and extracts the sheet area 61 by comparing the pixel value in read image data with a threshold value, and detects coordinates of the four corners 70A, 70B, 70C, and 70D of the sheet. The threshold value that divides the sheet area 61 and background area 62 may be set as a fixed value in advance or an average value of all pieces of read image data may be used. Here, in FIG. 6, the main scanning direction is represented by x, and the sub scanning direction is represented by y. The main scanning direction x and sub scanning direction y are also used in subsequent drawings.

The four corners 70A, 70B, 70C, and 70D of the sheet may be obtained from the intersection points in a linear approximation based on the plurality of coordinates detected as borders between the sheet area 61 and background area 62, or most outer coordinates of the four sides of the sheet area 61 may be used.

Next, the main register mark reference position detector 42 sets the main-register-mark windows in a size that respectively includes the whole main register mark, near the four corners detected in the read image data (step S5).

For example, as illustrated in FIG. 6, in the vicinity of the four corners 70A, 70B, 70C, and 70D of the sheet area 61 in the read image data, the main-register-mark windows 71A, 71B, 71C, and 71D are set as rectangular areas that are formed as having the four corners 70A, 70B, 70C, and 70D as one of those corners, respectively.

Next, the main register mark reference position detector 42 generates profile data in the main scanning direction and profile data in the sub scanning direction, in the main-register-mark windows set in the read image data (step S6).

Figure 7A:
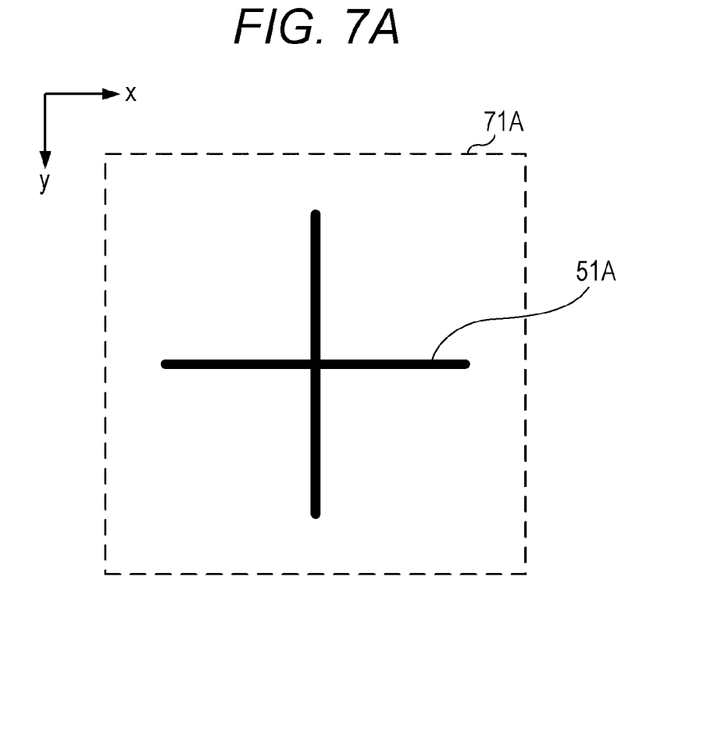
FIG. 7A is an example of a main-register-mark window taken from the read image data.
Figure 7B:
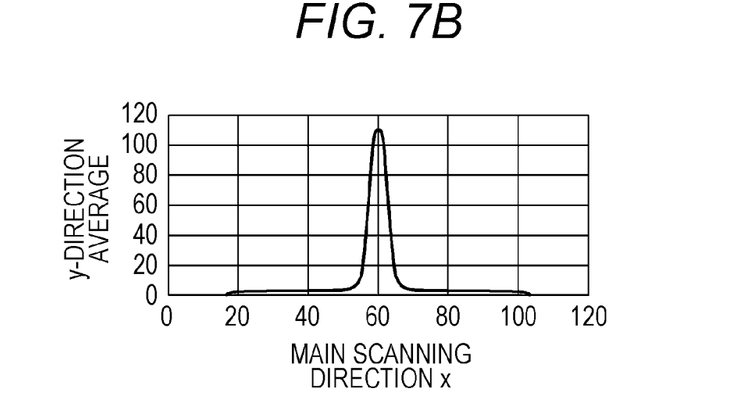
FIG. 7B is an example of profile data in a main scanning direction generated of the main-register-mark window.

FIG. 7A is an example of the main-register-mark window 71A which is taken from the read image data. FIG. 7B is an example of the profile data in the main scanning direction x generated for the main-register-mark window 71A. The profile data in the main scanning direction x is generated by averaging the pixel values of the respective pixels which are arranged in the sub scanning direction y, with respect to the respective positions in the main scanning direction x in the main-register-mark window 71A.

Next, the main register mark reference position detector 42 detects the reference position (four positions) of each main register mark based on the profile data of the main scanning direction and the profile data of the sub scanning direction (step S7).

More specifically, the main register mark reference position detector 42 detects a peak value from the profile data in the main scanning direction x, and detects a coordinate of the peak value (a position in the main scanning direction x) as the position of the intersection point in the cross shape of the register pattern. In the same manner, the main register mark reference position detector 42 detects a peak value from the profile data in the sub scanning direction y and detects a coordinate of the peak value (a position in the sub scanning direction y) as a position of the intersection point in the cross shape of the register pattern.

Next, the subsidiary register mark prediction position determiner 43 predicts positions of subsidiary register marks in the read image data by a projection conversion process based on the reference positions of the main register marks detected in the read image data and the reference positions of the main register marks in the document image data, and determines prediction positions of the subsidiary register marks (step S8).

Figure 8:
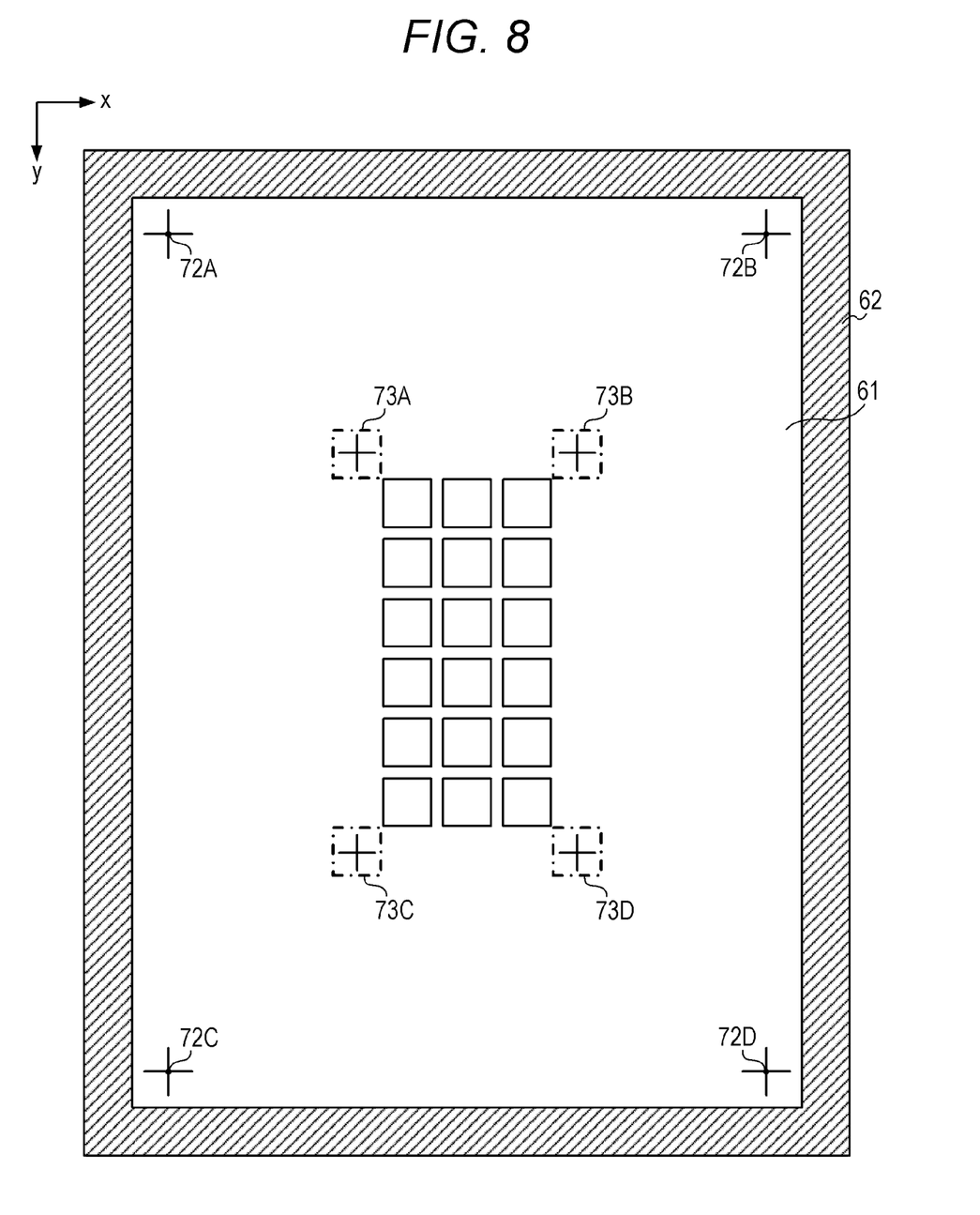
FIG. 8 is a diagram for explaining reference positions of main register marks and subsidiary-register-mark windows.

For example, in a projection conversion process that converts the respective reference positions of the main register marks in the document image data into reference positions 72A, 72B, 72C, and 72D of the main register marks detected in the read image data illustrated in FIG. 8, it is predicted where in the read image data the respective reference positions of the subsidiary register marks in the document image data are converted.

Next, the subsidiary register mark reference position detector 44 sets subsidiary-register-mark windows in a size that respectively includes the whole subsidiary register marks, based on the prediction positions of the subsidiary register marks in the read image data (step S9).

For example, as illustrated in FIG. 8, the subsidiary-register-mark windows 73A, 73B, 73C, and 73D are set to respectively include the whole subsidiary register mark, about the prediction position (reference position) of the subsidiary register marks in the read image data.

Next, the subsidiary register mark reference position detector 44 generates profile data in the main scanning direction and profile data in the sub scanning direction, in the subsidiary-register-mark windows set in the read image data (step S10).

Next, the subsidiary register mark reference position detector 44 detects reference positions of the subsidiary register marks based on the profile data in the main scanning direction and the profile data in the sub scanning direction (step S11). The detection of the reference positions of the subsidiary register marks is similar to the detection of the reference positions of the main register marks in step S7.

Next, the correction image prediction position determiner 45 predicts a position of the correction image in the read image data by the projection conversion process, based on the reference positions of the subsidiary register marks detected from the read image data and the reference positions of the subsidiary register marks in the document image data, and determines the prediction position of the correction image (step S12). The prediction position of the correction image may be a position that indicates one point included in the correction image or may be a position that indicates an area including a part of or the entire of the correction image.

Figure 9:
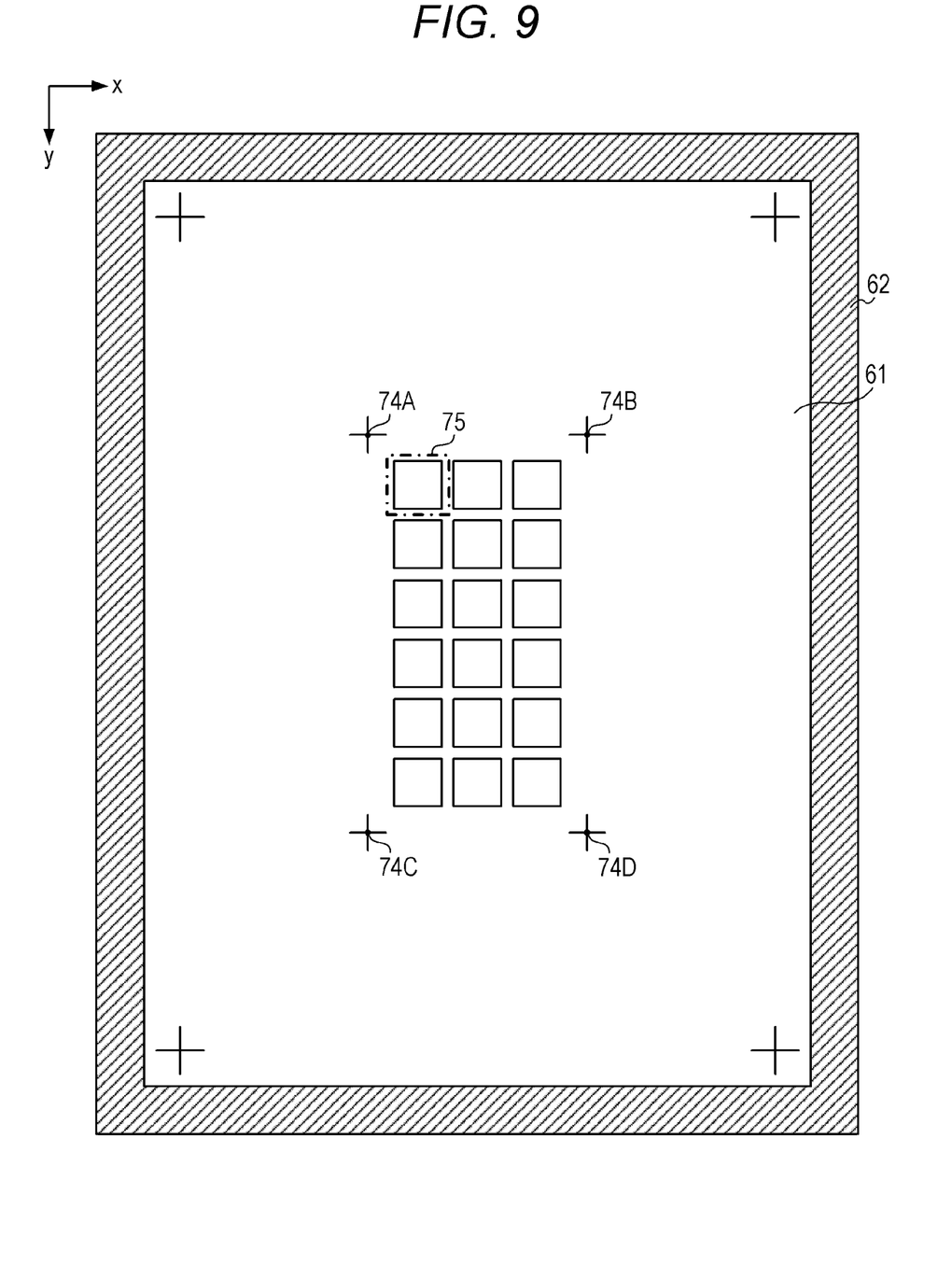
FIG. 9 is a diagram for explaining reference positions of the subsidiary register marks a correction-image windows.

For example, in the projection conversion process that converts the respective reference positions of the subsidiary register marks in the document image data into reference positions 74A, 74B, 74C, and 74D of the subsidiary register marks detected from read image data illustrated in FIG. 9, it is predicted to where in the read image data the respective correction images in the document image data are converted.

Next, the measured value obtainer 46 sets correction-image windows based on the prediction positions of the correction images in the read image data (step S13).

For example, as illustrated in FIG. 9, a correction-image window 75 is set so as to include the prediction position of the correction image in the read image data. In FIG. 9, as the correction-image window, a window that is used to detect one patch pattern is illustrated; however, in actual, a correction-image window is set respectively to each correction image.

Next, the measured value obtainer 46 obtains a measurement value from the correction image in the correction-image window (step S14).

Next, the correction value calculator 47 calculates a correction value related to the predetermined correction function based on the measurement value (step S15).

Next, the controller 11 applies the correction value calculated by the correction value calculator 47 to an image forming condition in the image former 20 or an image processing condition of image data in the image processor 19 (step S16).

With the above processes, a calibration process ends.

After the calibration process is performed, an image is formed in a condition that the correction value is being applied by the correction value calculator 47.

As described above, according to the present one or more embodiments, since the main register marks are provide in a position which has less influence of document image distortion, and the subsidiary register marks are provided near the correction images, the positions of the subsidiary register marks can be firstly detected based on the positions of the main register marks in the read image data, and the positions of the correction images can be accurately detected based on the positions of the subsidiary register marks. With this configuration, the positions of the correction images can be accurately detected even in a case that there is a reading distortion in the image reader 30 or a position misalignment due to distortion during the image formation. Thus, by using the measurement value obtained from the correction image, a preferable correction value can be calculated and reflected to a correction function.

Further, the four corners of the sheet can be accurately detected by extracting the sheet area from the read image data.

Further, in a case where the main register marks and subsidiary register marks are detected, since processing target areas (main-register-mark windows and subsidiary-register-mark windows) are set and reference positions of the register pattern are detected based on the profile data generated in the processing target area, the main register marks and subsidiary register marks can be accurately detected.

Further, since the position, size and pattern of the correction image are determined according to the correction function corresponding to the correction image, a preferable correction image can be added to the document image.

Further, by the projection conversion process, since the positions of the subsidiary register marks in the read image data and the positions of the correction images are predicted, nearby coordinates of the positions to be detected in the read image data can be obtained.

Modification Example

As a modification example of the above described embodiments, a case that second subsidiary register marks are provided between the main register marks and subsidiary register marks of the document image will be described. In the following, only a part different from the above described embodiments will be described.

Figure 10:
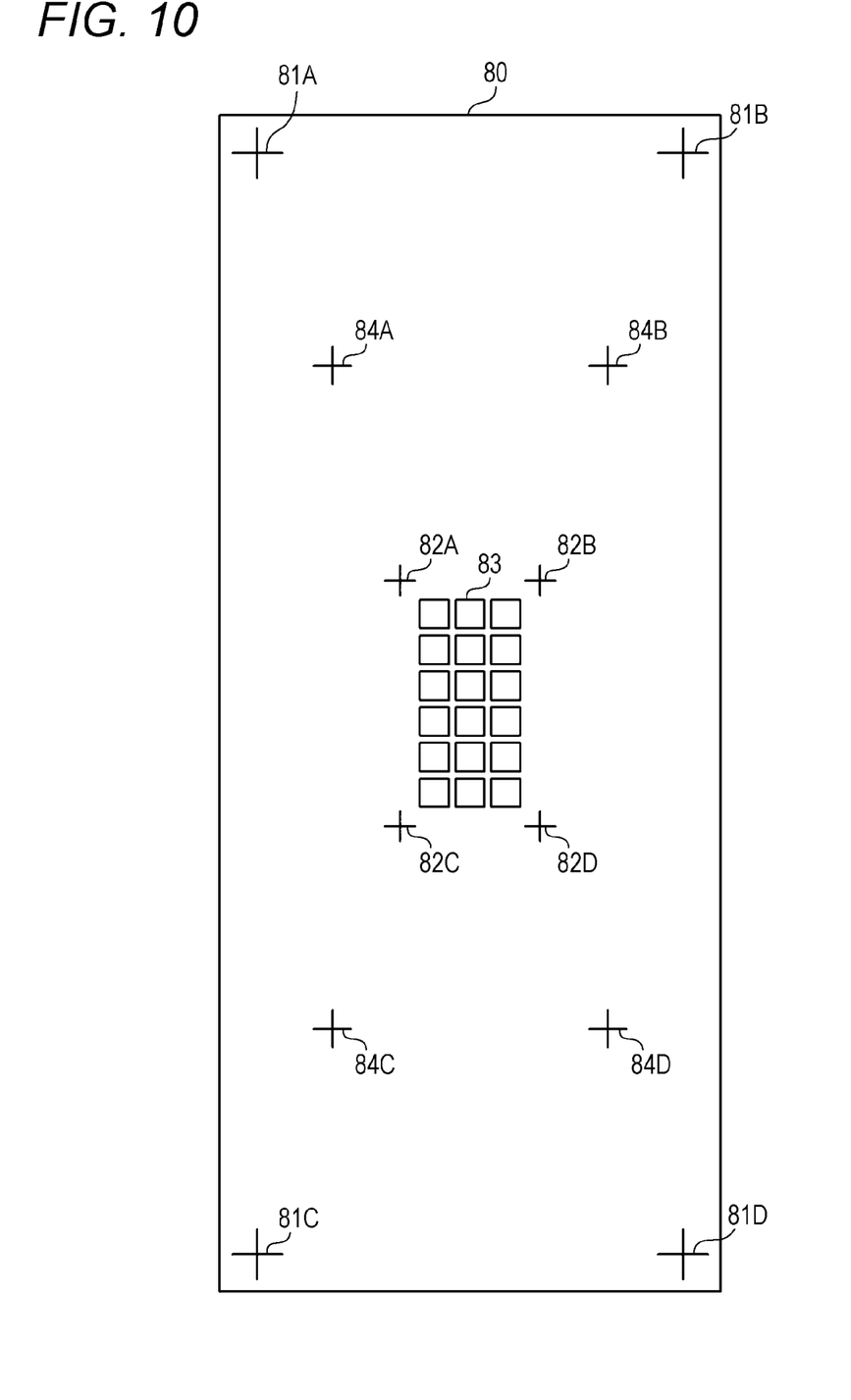
FIG. 10 is a diagram illustrating an example of document image of a modification example.

FIG. 10 illustrates an example of a document image according to the modification example.

As illustrated in FIG. 10, main register marks 81A, 81B, 81C, and 81D are provided near four corners of document image 80, and subsidiary register marks 82A, 82B, 82C, and 82D are provided near correction images 83. Further, according to the correction function or the size of the sheet, second subsidiary register marks 84A, 84B, 84C, and 84D are provided between the main register marks 81A, 81B, 81C, and 81D and the subsidiary register marks 82A, 82B, 82C, and 82D. The second subsidiary register marks 84A, 84B, 84C, and 84D are register patterns used to detect the subsidiary register marks 82A, 82B, 82C, and 82D.

In the modification example, in the calibration process illustrated in FIG. 3, the following process is executed as a substitute for step S8.

The subsidiary register mark prediction position determiner 43 firstly predicts positions of the second subsidiary register marks in the read image data according to the reference positions of the main register marks detected in the read image data and reference positions of the main register marks in the document image data, and determines prediction positions of the second subsidiary register marks. More specifically, the subsidiary register mark prediction position determiner 43 predicts positions of the second subsidiary register marks in the read image data by a projection conversion process based on the reference positions of the main register marks detected in the read image data and the reference positions of the main register marks in the document image data.

For example, in the example illustrated in FIG. 10, the prediction positions of the second subsidiary register marks 84A, 84B, 84C, and 84D in the read image data are respectively decided based on the reference positions of the main register marks 81A, 81B, 81C, and 81D in the read image data and document image data.

Next, the subsidiary register mark prediction position determiner 43 detects reference positions of the second subsidiary register marks in the vicinity of the prediction positions of the second subsidiary register marks in the read image data. More specifically, the subsidiary register mark prediction position determiner 43 sets second subsidiary-register-mark windows, as processing target areas, in a size that respectively includes the whole second subsidiary register mark, according to the prediction positions of the second subsidiary register marks in the read image data, generates profile data in the main scanning direction and sub scanning direction within the second subsidiary-register-mark windows, and detects the reference positions of the second subsidiary register marks based on the profile data.

Next, the subsidiary register mark prediction position determiner 43 predicts positions of the subsidiary register marks in the read image data according to the reference positions of the second subsidiary register marks in the read image data and the reference positions of the second subsidiary register marks in the document image data, and determines the prediction positions of the subsidiary register marks. More specifically, the subsidiary register mark prediction position determiner 43 predicts the positions of the subsidiary register marks in the read image data by a projection conversion process based on the reference positions of the second subsidiary register marks detected in the read image data and the reference positions of the second subsidiary register marks in the document image data.

For example, according to the example illustrated in FIG. 10, the prediction positions of the subsidiary register marks 82A, 82B, 82C, and 82D in the read image data are respectively determined based on the reference positions of the second subsidiary register marks 84A, 84B, 84C, and 84D in the read image data and document image data.

The processes following step S9 are similar to those in the above described embodiments.

According to the modification example, the positions of the correction images can be accurately detected by providing the second subsidiary register marks between the main register marks and subsidiary register marks in the document image. Especially, this is effective for the image forming apparatus that forms an image on a longer sheet of paper.

Further, in a case where an (N+1-th) subsidiary register mark used for detecting an N-th subsidiary register mark (N≥2) is provided in the document image, a similar process is sequentially repeated, and the positions of the correction images can be detected.

Here, the descriptions of the above embodiments and modification example are examples of the image forming apparatus according to the present invention and do not set any limitation. Detailed configurations and detailed operations of each part that composes the device may be also applied according to need within a scope the present invention.

The above embodiments and modification example describe the case that the projection conversion process is used to predict positions of the subsidiary register marks or correction images in the read image data; however, another method may be employed as long as the positions of the subsidiary register marks and correction images in the read image data can be predicted based on a misalignment between a position of the register pattern in the read image data and a target position (a position in the document image data).

For example, the subsidiary register mark prediction position determiner 43 may predict positions of the subsidiary register marks in the read image data by a position magnification process (a linear magnification process) based on the reference positions of the main register marks detected in the read image data and the reference positions of the main register marks in the document image data, and the correction image prediction position determiner 45 may predict the positions of the correction images in the read image data by a position magnification process based on the reference positions of the subsidiary register marks detected in the read image data and the reference positions of the subsidiary register marks in the document image data.

More specifically, coordinates of the subsidiary register marks and correction images in the read image data from the coordinates of the subsidiary register marks and correction images in the document image data, by executing a linear interpolation respectively in the main scanning direction and sub scanning direction based on which position in the read image data the respective positions (the reference positions of the main register marks and subsidiary register marks), which are used as references in the document image data, are detected.

With this method, nearby coordinates of the positions to be detected in the read image data can be also obtained.

Further, the register pattern used as the main register marks or the subsidiary register marks are not limited to the cross shape pattern and may be a hook-shaped pattern or a dot-shaped pattern.

Further, the above embodiments and modification example describe position of the intersection point in the cross shape of the register pattern as the reference position of the main register mark and subsidiary register mark; however, a centroid position of the register pattern or a position of a corner part of a hook-shaped pattern may be used as the reference position.

As a computer readable medium for storing a program to execute each process, a non-volatile memory such as a ROM and a flash memory, a portable storage medium such as a CD-ROM may be used in addition to a hard disk. Further, a carrier wave may be applied as a medium that provides program data via a communication line.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus comprising:
   an image former comprising a roller and that forms a document image including a correction image related to a predetermined correction function on a sheet of paper based on document image data;
   a sensor that reads a sheet surface on which the document image is formed, and generates read image data; and
   a calibrator that calculates a correction value related to the predetermined correction function based on the read image data, and performs correction related to the predetermined correction function based on the calculated correction value, wherein
   main register marks are provided near corners of the document image and a subsidiary register mark is provided near the correction image, and
   the calibrator:
      detects corners of the sheet of paper from the read image data;
      detects reference positions of the main register marks near the detected corners;
      predicts a position of the subsidiary register mark in the read image data from the detected reference positions of the main register marks and reference positions of the main register marks in the document image data, and determines a prediction position of the subsidiary register mark;
      detects a reference position of the subsidiary register mark in a vicinity of the prediction position of the subsidiary register mark;
      predicts a position of the correction image in the read image data according to the detected reference position of the subsidiary register mark and the reference position of the subsidiary register mark in the document image data, and determines a prediction position of the correction image;
      obtains a measurement value of the correction image based on the prediction position of the correction image; and
      calculates a correction value based on the measurement value.

2. The image forming apparatus according to claim 1, wherein
   the read image data includes a sheet area and a background area around the sheet area, and
   the calibrator extracts the sheet area by comparing a pixel value of the read image data with a threshold value and detects the corners of the sheet.

3. The image forming apparatus according to claim 1, wherein
   the calibrator sets processing target areas in a size that respectively includes a whole of the main register mark, near the detected corners, generates profile data in a main scanning direction and a sub scanning direction in the processing target areas, and detects the reference positions of the main register marks based on the profile data.

4. The image forming apparatus according to claim 1 wherein
   the calibrator sets a processing target area in a size that includes a whole of the subsidiary register mark, based on the prediction position of the subsidiary register mark, generates profile data in a main scanning direction and a sub scanning direction in the processing target area, and detects the reference position of the subsidiary register mark based on the profile data.

5. The image forming apparatus according to claim 1, wherein a position, a size or a pattern of the correction image are determined in advance based on the correction function related to the correction image.

6. The image forming apparatus according to claim 1, wherein
   a second subsidiary register mark is provided between the main register marks and the subsidiary register mark in the document image according to the correction function or a size of the sheet, and
   the calibrator:
      predicts a position of the second subsidiary register mark in the read image data according to the detected reference positions of the main register marks and the reference positions of the main register marks in the document image data, and determines a prediction position of the second subsidiary register mark,
      detects a reference position of the second subsidiary register mark in the vicinity of the prediction position of the second subsidiary register mark, and
      predicts a position of the subsidiary register mark in the read image data according to the detected reference position of the second subsidiary register mark and the reference position of the second subsidiary register mark in the document image data and determines the prediction position of the subsidiary register mark.

7. The image forming apparatus according to claim 1, wherein
   the calibrator predicts the position of the subsidiary register mark in the read image data by a projection conversion process based on the reference positions of the main register marks detected in the read image data and the reference positions of the main register marks in the document image data, and
   the calibrator predicts the position of the correction image in the read image data by a projection conversion process based on the reference position of the subsidiary register mark detected in the read image data and the reference position of the subsidiary register mark in the document image data.

8. The image forming apparatus according to claim 1, wherein
the calibrator predicts the position of the subsidiary register mark in the read image data by a position magnification process based on the reference positions of the main register marks detected in the read image data and the reference positions of the main register marks in the document image data, and
the calibrator predicts the position of the correction image in the read image data by a position magnification process based on the reference position of the subsidiary register mark detected in the read image data and the reference position of the subsidiary register mark in the document image data.

9. A calibration method of an image forming apparatus that forms a document image including a correction image related to a predetermined correction function on a sheet of paper based on document image data and that reads a sheet surface on which the document image is formed and generates read image data, the method comprising:
calculating a correction value related to the predetermined correction function based on the read image data, and performing correction related to the predetermined correction function based on the calculated correction value, wherein the document image is designed so that main register marks are provided near corners of the document image and a subsidiary register mark is provided near the correction image,
detecting corners of the sheet in the read image data;
detecting reference positions of the main register marks in a vicinity of the detected corners;
predicting a position of the subsidiary register mark in the read image data according to the detected reference positions of the main register marks and the reference positions of the main register marks in the document image data and determining a prediction position of the subsidiary register mark;
detecting a reference position of the subsidiary register mark in a vicinity of the prediction position of the subsidiary register mark;
predicting a position of a correction image in the read image data according to the detected reference position of the subsidiary register mark and the reference position of the subsidiary register mark in the document image data and determining a prediction position of the correction image;
obtaining a measurement value of the correction image based on the prediction position of the correction image; and
calculating a correction value based on the measurement value.

10. The calibration method according to claim 9, wherein
the read image data includes a sheet area and a background area around the sheet area, and
in the detecting of the corners, the sheet area is extracted by comparing a pixel value of the read image data with a threshold value.

11. The calibration method according to claim 9, wherein
in the detecting of the reference positions of the main register marks, processing target areas in a size that respectively includes a whole of the main register mark are set near the detected corners, profile data is generated in a main scanning direction and a sub scanning direction in the processing target areas, and the reference positions of the main register marks are detected based on the profile data.

12. The calibration method according to claim 9, wherein
in the detecting of the reference position of the subsidiary register mark, a processing target area in a size that includes the entire subsidiary register mark is set based on the prediction position of the subsidiary register mark, profile data in a main scanning direction and a sub scanning direction generated in the processing target area, and the reference position of the subsidiary register mark is detected based on the profile data.

13. The calibration method according to claim 9, wherein
a position, a size, and a pattern of the correction image are determined in advance according to the correction function related to the correction image.

14. The calibration method according to claim 9, wherein
a second subsidiary register mark is provided between the main register marks and the subsidiary register mark in the document image, according to the correction function or a size of the sheet, and
in the determining of the prediction position of the subsidiary register mark,
a position of the second subsidiary register mark in the read image data is predicted according to the detected reference positions of the main register marks and the reference positions of the main register marks in the document image data, and a prediction position of the second subsidiary register mark is determined,
a reference position of the second subsidiary register mark is detected in the vicinity of the prediction position of the second subsidiary register mark, and
the position of the subsidiary register mark in the read image data is predicted according to the detected reference position of the second subsidiary register mark and the reference position of the second subsidiary register mark in the document image data, and the prediction position of the subsidiary register mark is determined.

15. The calibration method according to claim 9, wherein
in the determining of the prediction position of the subsidiary register mark, the position of the subsidiary register mark in the read image data is predicted by a projection conversion process based on the reference positions of the main register marks detected in the read image data and the reference positions of the main register marks in the document image data, and
the correction image prediction position determiner predicts the position of the correction image of the read image data by the projection conversion process based on the reference position of the subsidiary register mark detected in the read image data and the reference position of the subsidiary register mark in the document image data.

16. The calibration method according to claim 9, wherein
in the determining of the prediction position of the subsidiary register mark, the position of the subsidiary register mark in the read image data is predicted by a position magnification process based on the reference positions of the main register marks detected in the read image data and the reference positions of the main register marks in the document image data, and
in the determining of the prediction position of the correction image, the position of the correction image in the read image data is predicted by the position magnification process based on the reference position of the subsidiary register mark detected in the read image data and the reference position of the subsidiary register mark in the document image data.

\* \* \* \* \*